(12) United States Patent
Koch et al.

(10) Patent No.: US 7,398,646 B2
(45) Date of Patent: Jul. 15, 2008

(54) HYDRAULIC STABILISING DEVICE FOR VEHICLES

(75) Inventors: Norbert Koch, Jettingen (DE); Walter Schulz, Stuttgart (DE)

(73) Assignee: Daimler AG, Stuttgart (DE)

( * ) Notice: Subject to any disclaimer, the term of this patent is extended or adjusted under 35 U.S.C. 154(b) by 316 days.

(21) Appl. No.: 10/529,062

(22) PCT Filed: Sep. 18, 2003

(86) PCT No.: PCT/EP03/10388

§ 371 (c)(1),
(2), (4) Date: Aug. 29, 2005

(87) PCT Pub. No.: WO2004/028838

PCT Pub. Date: Apr. 8, 2004

(65) Prior Publication Data
US 2006/0010863 A1    Jan. 19, 2006

(30) Foreign Application Priority Data
Sep. 24, 2002    (DE) .............................. 102 44 362

(51) Int. Cl.
*F15B 13/04* (2006.01)

(52) U.S. Cl. .......................................... 60/403; 91/445
(58) Field of Classification Search ................. 60/403; 91/6, 444, 445
See application file for complete search history.

(56) References Cited

U.S. PATENT DOCUMENTS

| | | | | |
|---|---|---|---|---|
| 2,804,883 A | * | 9/1957 | Curlett | 91/446 |
| 3,369,464 A | * | 2/1968 | Blattry | 91/447 |
| 5,060,968 A | | 10/1991 | Edahiro et al. | |

FOREIGN PATENT DOCUMENTS

| DE | 196 29 582 | 1/1998 |
|---|---|---|
| WO | WO 9826948 | 6/1998 |

* cited by examiner

*Primary Examiner*—F. Daniel Lopez
(74) *Attorney, Agent, or Firm*—Collard & Roe, P.C.

(57) ABSTRACT

A hydraulic stabilizing device for vehicles having an actuator which can be acted on in opposite directions comprises a switching device, which is formed by a directional control valve, and, in series with the switching device, a switching apparatus, which is formed by two separate directional control valves which are connected in parallel and correspondingly have a blocking position and different pass-through positions.

Figure 1:
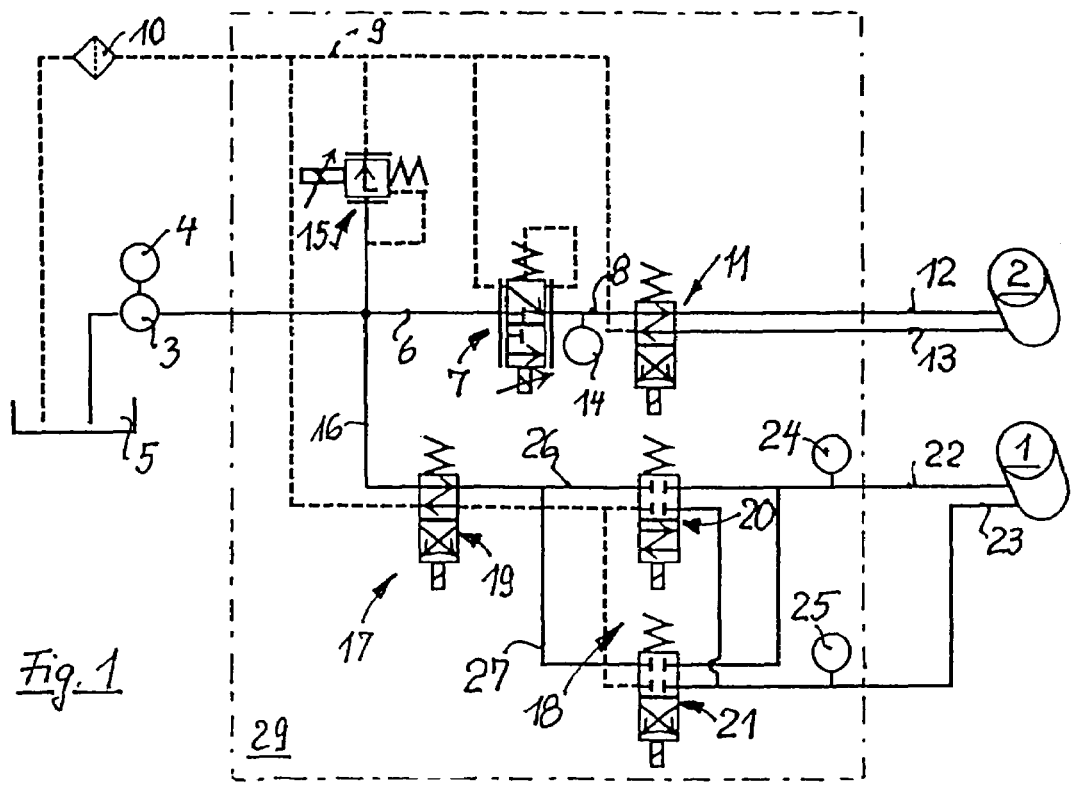

8 Claims, 1 Drawing Sheet

HYDRAULIC STABILISING DEVICE FOR VEHICLES

CROSS REFERENCE TO RELATED APPLICATIONS

Applicants claim priority under 35 U.S.C. §119 of German Application No. 102 44 362.9 filed Sep. 24, 2002. Applicants also claim priority under 35 U.S.C. §365 of PCT/EP2003/010388 filed Sep. 18, 2003. The international application under PCT article 21 (2) was not published in English.

The invention relates to a hydraulic stabilizing device for vehicles having an actuator that can be acted on in opposite directions, in particular to a stabilizing device having an actuator which is assigned to an axle of a vehicle, and has connection lines opening out on its acted-on sides corresponding to the opposite actuating directions. There is a switching device, which can be switched between a direct pass-through position and a crossed-over pass-through position. There is a switching apparatus in series with the switching device which can be switched between a pass-through position and a blocking position as its basic position, located in the connection of these connection lines to a pressure source and a pressure reducer.

Hydraulic stabilizing devices of the abovementioned type are known from DE 196 29 582 A1, in which two 4/2-way valves are arranged in series in the transition between a pump as pressure source which is supplied from a pressure reducer, on the one hand, and an actuator which can be acted on in the opposite direction, on the other hand; one of these 4/2-way valves is located adjacent to the pump as a switching device for switching between a direct pass-through position and a crossed-over pass-through position, and the other 4/2-way valve, located upstream of the switching device in the transition to the actuator, forms a switching apparatus, which can be switched between a pass-through position and a blocking position, with the blocking position forming the basic position. The purpose of this arrangement is to allow pressure to be applied to either side of the actuator by means of the switching device and at the same time to ensure by means of the switching apparatus that in the event of a failure of the control device assigned to the switching device and/or the switching apparatus, and also, for example, in the event of the switching device becoming stuck in an intermediate position, the actuator is shut off from the pressure source and pressure reducer and thereby blocked by means of the switching apparatus, the basic position of which is a blocking position, so that a defined functional state is ensured.

Consequently, any failure of the switching device causes the actuator to be blocked and makes the active stabilizing inoperative, which is regarded as a considerable loss of comfort and safety when one is accustomed to an active stabilizing system of this type, forcing the driver to visit the workshop.

The invention is based on the object of developing a stabilizing device of the type described in the introduction in such a way that, without any loss of safety, malfunctions both in the switching device and in the switching apparatus can in each case be corrected in the system, to allow the actuator to continue to operate actively, at least for a transitional period.

According to the invention, this is achieved by the hydraulic stabilizing device for vehicles having an actuator that can be acted on in opposite directions, and in particular to a stabilizing device having an actuator which is assigned to an axle of a vehicle, and has connection lines opening out on its acted-on sides corresponding to the opposite actuating directions. There is a switching device, which can be switched between a direct pass-through position and a crossed-over pass-through position. There is a switching apparatus in series with the switching device which can be switched between a pass-through position and a blocking position as its basic position, located in the connection of these connection lines to a pressure source and a pressure reducer. The switching apparatus is formed by two separate switching valves which are connected in parallel, have different pass-through positions and in each case a blocking position, and therefore can be designed in a simple way as 4/2-way valves. If the switching device, which preferably has a direct pass-through position as its springloaded basic position and can likewise be designed in a simple way as a 4/2-way valve with a direct pass-through position and a crossed-over pass-through position as switching positions, fails, actuation of the actuator on either side can be ensured by corresponding actuation of the switching valves which form the switching apparatus. Although if one of the switching valves of the switching apparatus fails, only direct or crossed-over actuation of the actuator is then possible via the switching valves of the switching apparatus, in combination with suitable actuation of the switching device, actuation of the actuator on either side is still possible. Consequently, the probability of a system failure forcing the actuator to become blocked is significantly reduced, and necessary repair work can generally be reduced to workshop visits forming part of preset service intervals.

Moreover, the solution according to the invention, without imposing any restrictions on functionality, offers extensive options in terms of the arrangement of switching device and switching apparatus in the transition between pump and actuator; they can also be combined in a valve block.

The hydraulic stabilizing device according to the invention has proven expedient for one of the axles, in particular the front axle of a passenger vehicle, in which case the actuator provided is in particular a hydraulic motor, by means of which the two halves of a stabilizer can be displaced with respect to one another. Of course, however, it is also within the scope of the invention to provide a hydraulic stabilizing device according to the invention for all the axles of two-axle or multi-axle, multi-track vehicles. However, other application areas, for example in the actuation and control of actuators in power assisted steering systems, are also within the scope of the invention, in which case hydraulic motors and linear actuators, such as hydraulic cylinders, may be provided as actuators.

Furthermore, it has proven advantageous to use a hydraulic stabilizing device according to the invention on an axle of a multi-axle, in particular two-axle, vehicle which also has an actuator, which can be acted on in the opposite direction and is designed in particular as a hydraulic motor, for the second axle, preferably the rear axle.

Figure 2:
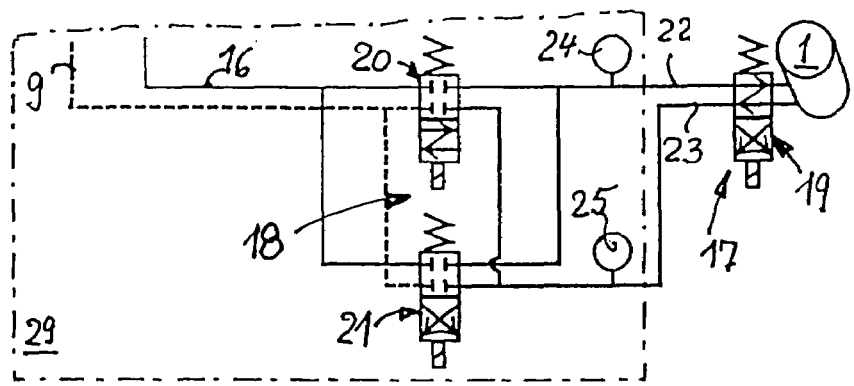
Figure 3:
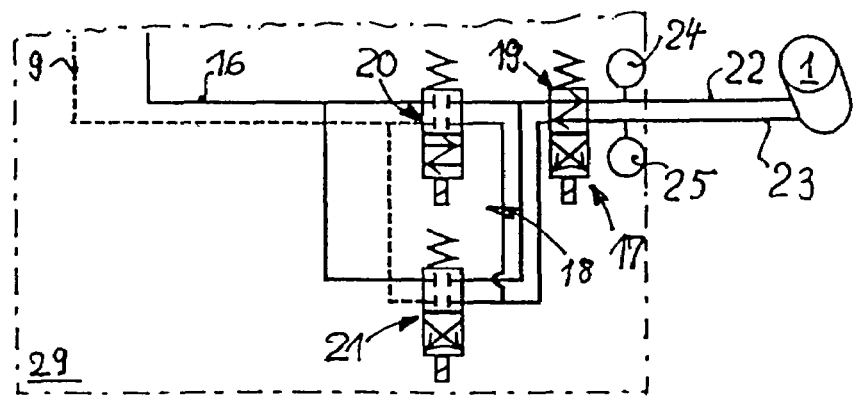

Furthermore, the invention is explained in more detail below on the basis of exemplary embodiments. In the drawing:

FIG. 1 shows a schematic view of a hydraulic circuit diagram for a two-axle vehicle, designed in particular as a passenger automobile, with active roll stabilizing, the front axle of the vehicle being assigned a hydraulic stabilizing device according to the invention, and FIGS. 2 and 3 show schematic views of various configurations and 3 of the hydraulic stabilizing device according to the invention assigned to the front axle.

FIG. 1 illustrates, in highly diagrammatic form, the hydraulic system of an active roll stabilizer for two-axle vehicles, in particular passenger automobiles, with the front axle and the rear axle respectively being assigned an actuator 1 and 2, symbolically represented as a hydraulic motor, which is located between the stabilizer parts assigned to the two axle sides and by means of which the stabilizer parts can be rotated in opposite directions to one another in accordance with the respective hydraulic pressure applied. Based on the exemplary embodiments illustrated, the actuator 1 is assigned in particular to the front axle, and the actuator 2 is assigned in particular to the rear axle, of a respective vehicle.

The actuators 1 and 2 are incorporated into the hydraulic system of the active roll stabilizer, which as pressure source have a pump 3 which is designed, for example, as a radial piston pump and is driven by means of the motor 4. The pump 3 is supplied from the reservoir 5, at which the return opens out; in the exemplary embodiment illustrated, the line connections which can be subjected to pressure are all illustrated by solid lines, while the line sections on the low pressure side which end at the reservoir 5 are indicated by dashed lines.

Starting from the pump 3, in the pressure-side line 6 there is a throttling 2/2-way valve 7, which is spring- and pressure-loaded into a basic position, in which the pressure-side connection to the actuator 2 is blocked off and the line 8, which can be acted on by pressure and leads from the directional control valve 7 to the actuator 8, is connected to the return line 9 on the low-pressure side, which opens out at the reservoir 5 and in which a filter 10 is provided in the outlet to the reservoir 5. A 4/2-way valve 11, which has a spring-loaded basic position, in which a direct pass-through connection is produced, and a second switching position for a crossed-over through-passage, is connected to the directional control valve 7 via the line 8. Depending on the switching position, one of the lines 12 or 13, in the connection of the directional control valve 11 to the actuator 2, is connected to the line 8 which can be subjected to pressure or to the return line 9. The line 8 is assigned a pressure sensor 14, and furthermore on the pressure side pressure is limited by means of a pressure-limiting valve 15, with the passage cross section of the pressure-limiting valve 15 and of the throttling directional control valve 7 being variable according to the energizing of their actuating magnets. Actuation is effected by means of a control unit (not shown), as it is for the directional control valve 11 which can simply be switched over, taking account of parameters that are relevant for roll stabilizing and/or pressure values recorded by the pressure sensor 4.

The pressure-side line 6 which is connected to the pump 3 and via the pressure-limiting valve 15 has a connection to the return-side line 9, has a line connection 16 to the actuator 1 assigned to the front axle, with a switching device 17 and a switching apparatus 18 provided one behind the other, i.e. in series, in the line connection 16. In the exemplary embodiment shown in FIG. 1, starting from the pump 3, the switching device 17 is located upstream of the switching apparatus 18 and is formed by a 4/2-way valve 19, which can be switched between a direct pass-through position and a crossed-over pass-through position and is preloaded, in particular spring-loaded, onto the direct pass-through position as its basic position.

Downstream of the switching device 17 on the pressure side is the switching apparatus 18, which is formed by two 4/2-way valves 20 and 21 which are independent of one another and each have a blocking position and a pass-through position, with the pass-through position being formed directly for one of the directional control valves, in this case the directional control valve 20, and crossed over for the directional control valve 21. Accordingly, the line connection 16 is respectively connected to one of the lines 22 or 23, via which the actuator 1 can optionally be acted on by pressure in order to be adjusted in opposite directions, as a function of the switching position via the directional control valves 20 and 21 of the switching apparatus 18. The directional control valves 20 and 21 have their blocking position as the basic position into which they are loaded, in particular spring-loaded, and they can be adjusted, for example magnetically, in the opposite direction, with the actuation once again being effected by means of the control unit which has already been mentioned above. In the event of actuation, in each case only one of the directional control valves 20 and 21 is switched into a pass-through position, with the result that on the pressure side, and correspondingly also on the low pressure side, a direct pass-through connection is produced when the directional control valve 20 is actuated and a crossed-over pass-through connection is produced when the directional control valve 21 is actuated.

24 and 25 denote pressure sensors which are assigned to the lines 22 and 23 and, although this is not shown, are connected to the control unit. Furthermore, the directional control valves 20 and 21 are connected in parallel with regard to their line connections.

The outlined combination of switching device 17 formed by a directional control valve 19 and switching apparatus 18 formed by directional control valves 20 and 21 offers particular advantages with regard to safety and resulting servicing requirements, since full functionality remains ensured both in the event of a failure in the switching function for the directional control valve 19 and in the event of a failure in the switching function for the directional control valves 20 or 21. If the directional control valve 19 fails, it adopts its basic position, in which the pressure-side line connection to a line 26 and to a line 27 branching off from it is produced. Accordingly, the same connections are acted on by pressure with regard to the valves 20 and 21. Via these connections, when the valve 20 is switched a connection is produced to the line 22, and when the valve 21 is switched, a connection is produced to the line 23, so that the actuator 1 can be acted on in the opposite direction irrespective of the directional control valve 19 remaining in its basic position. The same also applies if the directional control valve 19 were to remain stuck in its crossed-over pass-through position, as a result of it becoming jammed.

If one of the directional control valves 20 or 21 fails, full functionality is still ensured. The valve which fails remains in its blocking position, for example the valve 20, in which case the other valve 21 is acted on and produces a crossed-over connection. This once again allows the actuator 1 to be acted on either side as a function of the particular switching position of the directional control valve 19, which forms the switching device 18. A blocking position, resulting in the actuator 1 being blocked, results irrespective of this variability, for example as a result of the energizing of the two directional control valves 20 and 21 of the switching apparatus 18 failing. On account of the fact that, in combination with the arrangement outline, the function of one of the directional control valves 19 or 20 or 21 can be performed by corresponding switching in the assembly by the other directional control valves 19 or 20 or 21, the overall result is an increased reliability against total failure, and in particular full functionality is maintained with a sufficient safety margin, so that there is no need for immediate repair and any repair measures can be concentrated on the standard service intervals.

FIGS. 2 and 3 show a structure which has been altered with respect to the position in which the switching device 17 is incorporated with respect to the hydraulic stabilizing device comprising the actuator 1 on the front axle side, and only the corresponding excerpt from FIG. 1 is shown; identical parts are provided with identical designations and reference is made to the description of the functions thereof which has been given with reference to FIG. 1.

As a modification to FIG. 1, the switching device 17 in FIGS. 2 and 3 is not arranged downstream, but rather upstream of the switching apparatus 18 and in the transition from the latter to the actuator 1; in FIG. 2, the directional control valve 19 of the switching device 17 is arranged as a separate component in the immediate feed to the actuator 1, and if appropriate may even be integrated therein, while in FIG. 3 the switching device 17 and the directional control valve 19 which forms it are integrated in a valve block 29 in which, if appropriate, the abovementioned control and monitoring elements may be incorporated. The hydraulic stabilizing device according to the invention therefore allows considerable variation not only in functional terms but also in the design structure.

In the context of the invention, actuators which may be used include both hydraulic motors and hydraulic actuating cylinders, and furthermore it is also within the scope of the invention to actuate not only the front axle but also the rear axle or only the rear axle by means of a combination of switching device 17 and switching apparatus 18 in terms of the actuator thereof.

The invention claimed is:

1. A hydraulic stabilizing device for vehicles, having an actuator that is selectively acted on in opposite directions with a switching device, which is switched between a direct pass-through position and a crossed-over pass-through position, and, in series with the switching device, a switching apparatus, which is switched between a pass-through position and a blocking position as its basic position, located in the connection of connection lines to a pressure source and a reservoir, wherein the switching apparatus (18) comprises two separate switching valves (20, 21) which are arranged in parallel with one another and of which one switching valve (20) has a blocking position and a direct pass-through position and the other switching valve (21) has a blocking position and a crossed-over pass-through position, wherein said device is a roll stabilizing device and wherein the actuator is assigned to an axle of a vehicle and said connection lines open out on its acted-on sides corresponding to the opposite directions.

2. The hydraulic stabilizing device as claimed in claim 1, wherein the switching device (17) is formed by a 4/2 way valve.

3. The hydraulic stabilizing device as claimed in claim 1, wherein the switching valves (20, 21) of the switching apparatus (18) are formed by 4/2 way valves.

4. The hydraulic stabilizing device as claimed in claim 1, wherein the switching device (17) is arranged downstream of the switching apparatus (18).

5. The hydraulic stabilizing device as claimed in claim 1 wherein pressure sensors (24, 25) are arranged downstream of the switching apparatus (18) in the lines (22, 23) leading to the actuator.

6. The hydraulic stabilizing device as claimed in claim 5, wherein the pressure sensors (24, 25) are located between switching apparatus (18) and switching device (17).

7. A hydraulic stabilizing device for vehicles, having an actuator that is selectively acted on in opposite directions with a switching device, which is switched between a direct pass-through position and a crossed-over pass-through position, and, in series with the switching device, a switching apparatus, which is switched between a pass-through position and a blocking position as its basic position, located in the connection of connection lines to a pressure source and a reservoir, wherein the switching apparatus (18) comprises two separate switching valves (20, 21) which are arranged in parallel with one another and of which one switching valve (20) has a blocking position and a direct pass-through position and the other switching valve (21) has a blocking position and a crossed-over pass-through position, and wherein the switching device (17) is arranged upstream of the switching apparatus (18).

8. A hydraulic stabilizing device for vehicles, having an actuator that is selectively acted on in opposite directions with a switching device, which is switched between a direct pass-through position and a crossed-over pass-through position, and, in series with the switching device, a switching apparatus, which is switched between a pass-through position and a blocking position as its basic position, located in the connection of connection lines to a pressure source and a reservoir, wherein the switching apparatus (18) comprises two separate switching valves (20, 21) which are arranged in parallel with one another and of which one switching valve (20) has a blocking position and a direct pass-through position and the other switching valve (21) has a blocking position and a crossed-over pass-through position, and further comprising pressure sensors (24, 25) arranged downstream of the switching apparatus in the lines leading to the actuator, and downstream of the switching device (19).

* * * * *